(12) United States Patent
Lee et al.

(10) Patent No.: US 9,720,192 B2
(45) Date of Patent: Aug. 1, 2017

(54) INTERFACE FOR TRANSMITTING HIGH-SPEED SIGNAL AND OPTICAL MODULE INCLUDING THE SAME

(71) Applicant: ELECTRONICS AND TELECOMMUNICATIONS RESEARCH INSTITUTE, Daejeon-si (KR)

(72) Inventors: Jyung Chan Lee, Daejeon-si (KR); Eun Gu Lee, Daejeon-si (KR); Sil Gu Mun, Daejeon-si (KR); Sang Soo Lee, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 231 days.

(21) Appl. No.: 14/619,539

(22) Filed: Feb. 11, 2015

(65) Prior Publication Data

US 2015/0229402 A1    Aug. 13, 2015

(30) Foreign Application Priority Data

Feb. 12, 2014 (KR) ........................ 10-2014-0016185

(51) Int. Cl.
  *H04B 10/00* (2013.01)
  *G02B 6/42* (2006.01)
(52) U.S. Cl.
  CPC .................................. *G02B 6/4279* (2013.01)
(58) Field of Classification Search
  CPC .. H04B 10/40; H04B 10/2575; H04B 10/501;
                              H04B 10/2503; H04B 10/541
  USPC ....... 398/135, 136, 137, 138, 139, 164, 182,
                    398/202, 158, 159, 192, 193, 194, 200,
                    398/201, 208; 385/88, 89, 90, 92, 93, 14
  See application file for complete search history.

(56) References Cited

U.S. PATENT DOCUMENTS

| | | | |
|---|---|---|---|
| 8,412,052 B2* | 4/2013 | Mohammed | G02B 6/4249 385/52 |
| 9,297,971 B2* | 3/2016 | Thacker | G02B 6/4274 |
| 2008/0191818 A1 | 8/2008 | Lee et al. | |
| 2012/0063787 A1* | 3/2012 | Yagisawa | H04B 10/801 398/164 |
| 2012/0235764 A1 | 9/2012 | Kang et al. | |

OTHER PUBLICATIONS

Sae-Kyoung Kang, et al; "A Cost-effective and Compact 28-Gb/s ROSA Module using a Novel To-CAN Package", Published in: Electronic Components and Technology Conference (ECTC), 2012 IEEE 62nd; May 29, 2012-Jun. 1, 2012; pp. 1992-1996.

* cited by examiner

*Primary Examiner* — Hanh Phan
(74) *Attorney, Agent, or Firm* — Ladas & Parry LLP (57) ABSTRACT

An interface for transmitting a high-speed signal and an optical module including the same. The interface may include a main substrate and a sub-substrate. The main substrate may have at least one high-speed signal line formed on the upper surface of the main substrate. The sub-substrate may have a first conductive line formed on the lower surface thereof so as to adjust high-speed signal transmission characteristics of the high-speed signal line, wherein the first conductive line may be coupled to the upper surface of the main substrate and partially overlap with the high-speed signal line.

14 Claims, 10 Drawing Sheets

INTERFACE FOR TRANSMITTING HIGH-SPEED SIGNAL AND OPTICAL MODULE INCLUDING THE SAME

CROSS-REFERENCE TO RELATED APPLICATION(S)

This application claims the benefit under 35 U.S.C. §119(a) of Korean Patent Application No. 10-2014-0016185, filed on Feb. 12, 2014, in the Korean Intellectual Property Office, the entire disclosure of which is incorporated herein by reference for all purposes.

BACKGROUND

1. Field

The following description relates to both an interface that can be used in transmitting a high-speed signal and an optical module including the interface.

2. Description of the Related Art

The technology of electronic devices is facing the need to make the devices faster, lighter, and more integrated due to the wide use of personal computers, dissemination of Long-Term Evolution-Advanced (LTE-A) personal cellular phones, high-speed transmission networks for multimedia services, the expansion of an optical subscriber network, the storage of large data, and an emphasis on the importance of a backup device.

Generally, an optical-electrical conversion optical device or electrical-optical conversion optical device is used as a form of an optical module. This optical module has an electrical signal interface for an optical-electrical or an electrical-optical conversion. The optical-electrical conversion may be performed by an optical receiving module, and the electrical-optical conversion may be performed by an optical transmitting module. The electrical signal interface of the optical module is built within an optical transceiver and is connected to printed circuit boards (PCBs) in various forms and manners therein. For example, the manner in which the interface and the PCBs are connected may be a direct connection using solder, a connection using a flexible PCB, etc.

Already optimized for the electrical signal characteristics for the connection to the optical transceiver, the optical module is designed. However, optimum conditions of an optical module's electrical signal characteristics may vary depending on the signal transmission path (i.e., either a method of internally or externally connecting the optical transceivers in the electrical signal interface). Thus, difficulties in changing the optical module occur due to the decrease of high-speed signal transmission characteristics, or various signal lines for the high-speed signal transmission.

Accordingly, the problems, which occur when connecting PCBs of different types and when structuring various signal lines for high-speed signal transmission, need to be solved for making the devices in the high-speed device technology faster, lighter, and more integrated.

SUMMARY

The following description relates to an interface for transmitting a high-speed signal and an optical module including the same, which prevents a decrease in high-speed signal transmission characteristics through simple changes even though optimum conditions of electrical signal characteristics are changed.

In one general aspect, an interface for transmitting a high-speed signal includes a main substrate and a sub-substrate. The main substrate has at least one high-speed signal line formed on an upper surface thereof. The sub-substrate has a first conductive line formed on a lower surface thereof so as to adjust high-speed signal transmission characteristics of the at least one high-speed signal line, and is coupled to the upper surface of the main substrate in such a manner that the first conductive line partially overlaps with the at least one high-speed signal line.

In another general aspect, an optical module includes an interface for transmitting a high-speed signal, a case, and an optical element. The interface includes: a main substrate having high-speed signal lines arranged on an upper surface thereof; and a sub-substrate, which has first conductive lines arranged and formed on a lower surface thereof in a same form as the high-speed signal lines so as to adjust high-speed signal transmission characteristics of the high-speed signal lines, and is coupled to the upper surface of the main substrate in such a manner that the first conductive lines partially overlap, respectively, with the high-speed signal lines. The case accommodates the interface through an opening on the end thereof in such a manner that one end of each of the high-speed signal lines is outwardly exposed. An optical element accommodated in the case and electrically connected to at least a part of the high-speed signal lines.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
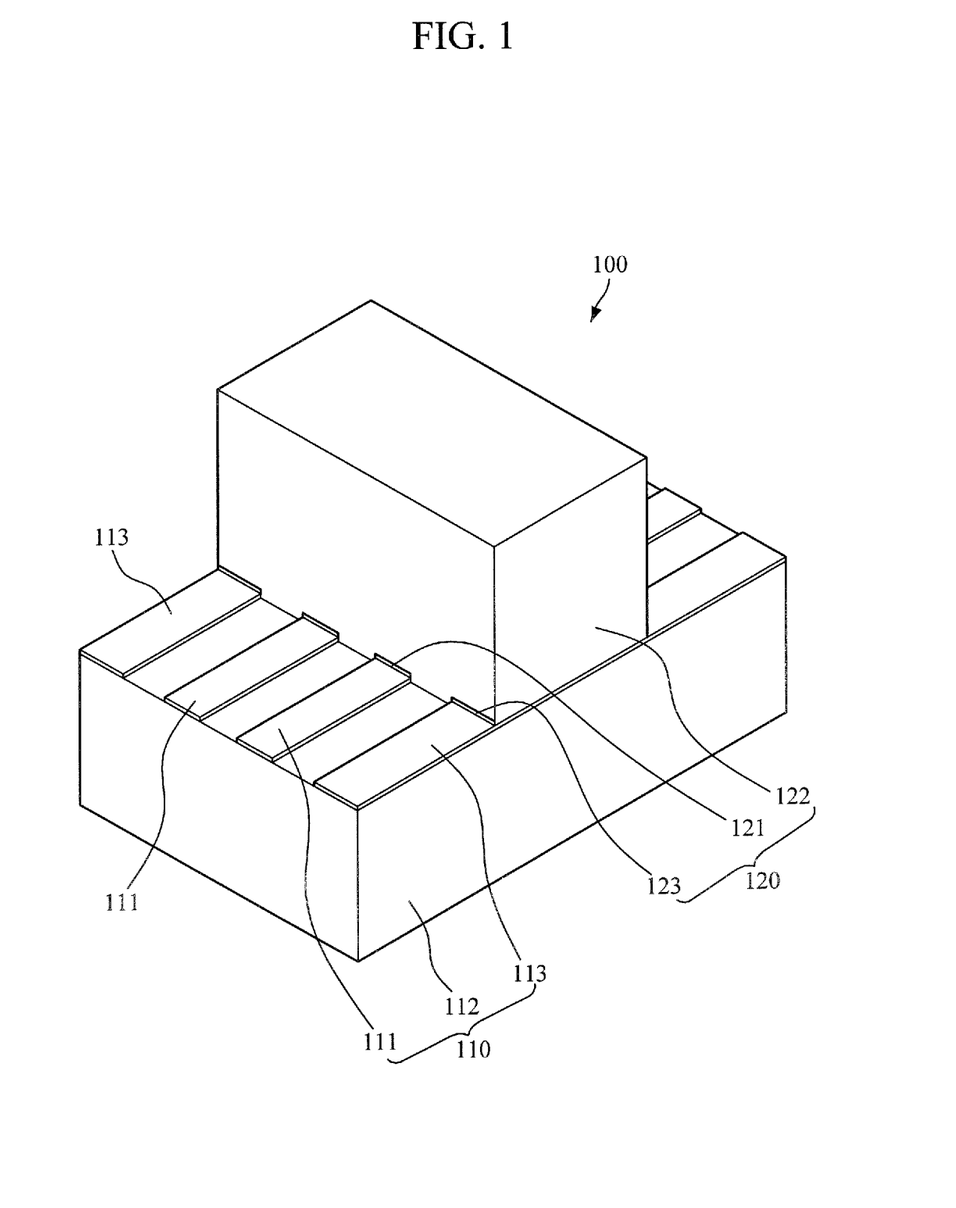
FIG. 1 is a perspective view, according to an exemplary embodiment, illustrating an interface for transmitting a high-speed signal.
Figure 2:
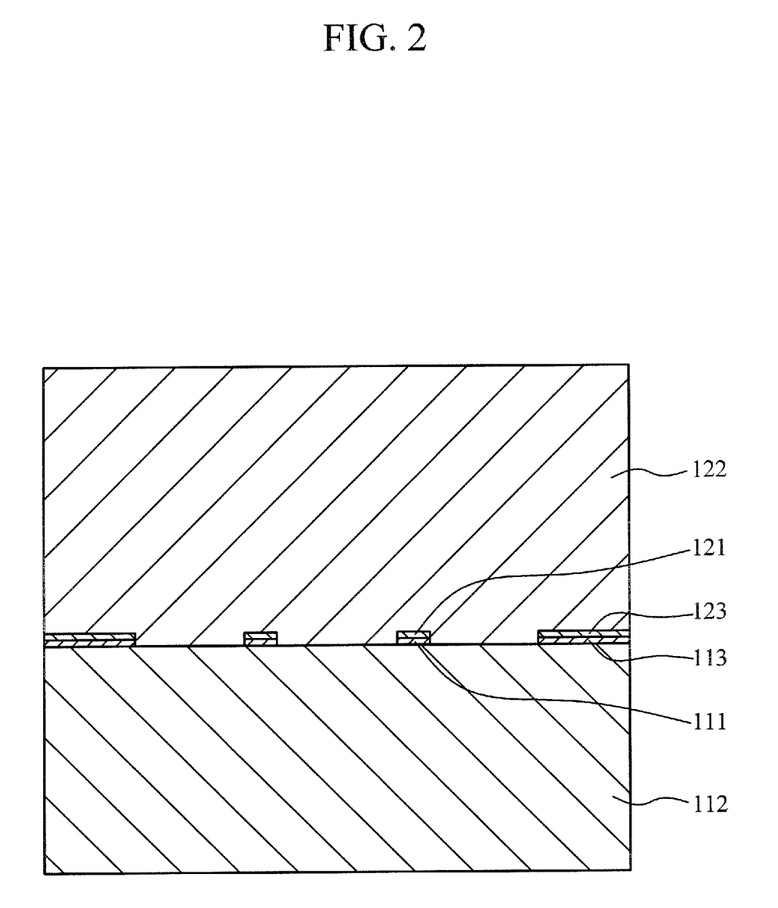
FIG. 2 is a cross-sectional view of FIG. 1.
Figure 3:
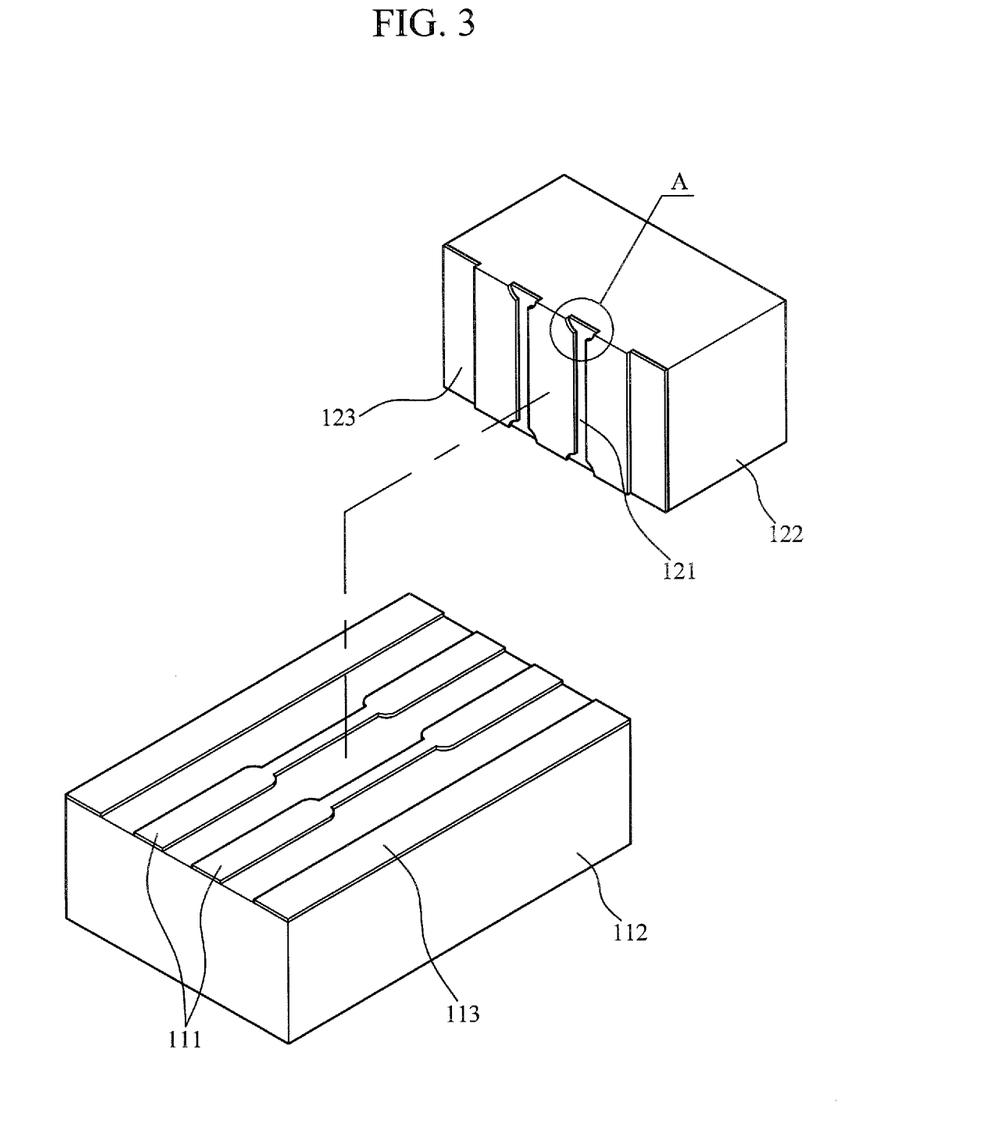
FIG. 3 is an exploded perspective view of FIG. 1.
Figure 4:
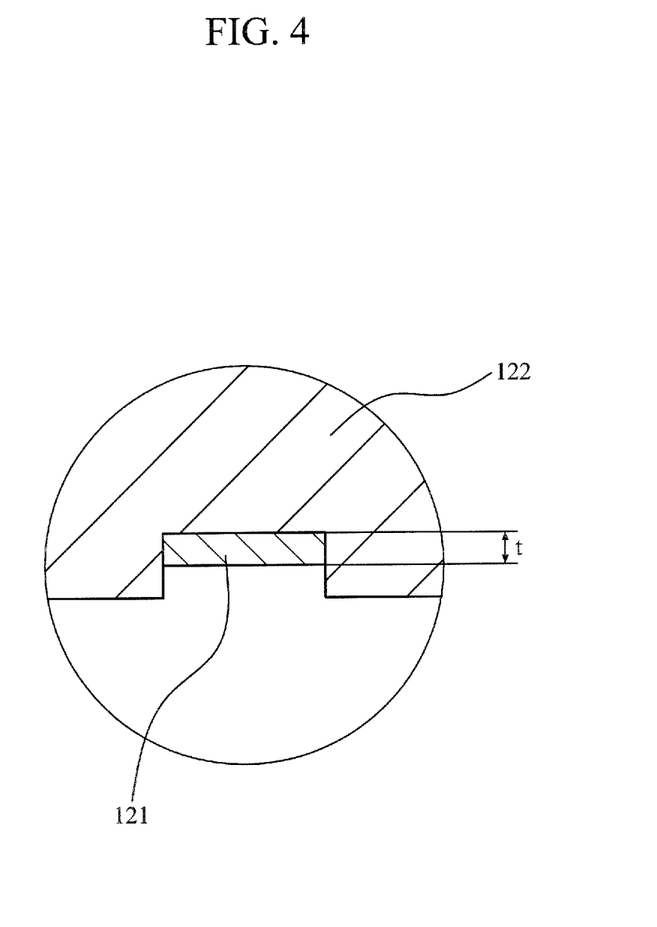
FIG. 4 is a cross-sectional view of area A in FIG. 3.

FIG. 1 is a perspective view, according to an exemplary embodiment, illustrating an interface for transmitting a high-speed signal. FIG. 2 is a cross-sectional view of FIG. 1. FIG. 3 is an exploded perspective view of FIG. 1. FIG. 4 is a cross-sectional view of area A in FIG. 3.

Referring to FIGS. 1 and 4, an interface 100 for transmitting a high-speed signal includes a main substrate 110 and a sub-substrate 120.

The main substrate 110 includes at least one high-speed signal line 111 for transmitting a high-speed signal, which is formed on the upper surface thereof. For example, the main substrate 110 may include the high-speed signal line 111 formed on the upper surface of a main dielectric material 112. The main dielectric material 112 may be formed in the shape of a rectangular plate. Such high-speed signal line 111 may be formed on the upper surface of the main dielectric material 112 to be of a uniform thickness. The high-speed signal line 111 may be made of a conductive metallic material such as copper; and may be formed in pairs.

In addition, ground lines 113 may be formed on the upper surface of the main substrate 110. The ground lines 113 may be made of a conductive metallic material with a uniform thickness and width and formed on the upper surface of the main dielectric material 112. The ground lines 113 may be disposed on both sides of a pair of the high-speed signal lines 111, wherein the pair is placed between the ground lines 113.

The sub-substrate 120 includes a first conductive line 121, which is formed onto its undersurface. The first conductive line 121 is used to control high-speed signal transmission characteristics. The sub-substrate 120 is coupled to the upper surface of the main substrate 110 in such a manner that the first conductive line 121 partially overlaps with the high-speed signal line 111. Partially overlapped with the high-speed signal line 111, the first conductive line 121 is electrically connected to the high-speed signal line 111.

For example, the sub-substrate 120 may include the first conductive line 121, which is formed onto the lower surface of a sub-dielectric material 122. The first conductive line 121 may be formed with the same materials as the high-speed signal line 111. In a case in which a pair of the high-speed signal lines 111 is formed onto the upper surface of the main substrate 110, first conductive lines 121 may be formed in pairs so as to overlap partially with the high-speed signal lines 111. The first conductive line 121 may be formed to overlap partially with the high-speed signal line 111.

The sub-substrate 120 may be coupled to the upper surface of the main substrate 110 so that both ends of the high-speed signal lines 111 are outwardly exposed. One end of each high-speed signal line 111 may be electrically connected to an optical element, such as a photodetector or a light-emitting element. The other ends of the high-speed signal lines 111 may be electrically connected to a printed circuit board (PCBs) of an optical transceiver. Also, both ends of the ground lines 113 may be outwardly exposed in the same way as the high-speed signal lines 111.

A second conductive line 123 may be formed onto the lower surface of the sub-substrate 120. Partially overlapped with the ground line 113, the second conductive line 123 is electrically connected to the ground line 113. The second conductive line 123 may be formed with the same materials as the ground line 113 on the lower surface of the sub-dielectric material 122. The second conductive line 123 may be formed to overlap with the ground line 113. In a case in which a plurality of the ground lines 113 have been formed onto the upper surface of the main substrate 110, the second conductive lines 123 may be formed to partially overlap, respectively, with the ground lines 113.

The lower surface of the sub-substrate 120 may be engaged with and tightly coupled to the upper surface of the main substrate 110 in the opposite shape to one another. Thus, the sub-substrate 120 may maintain with the main substrate 110 being more strongly coupled thereto.

Figure 5:
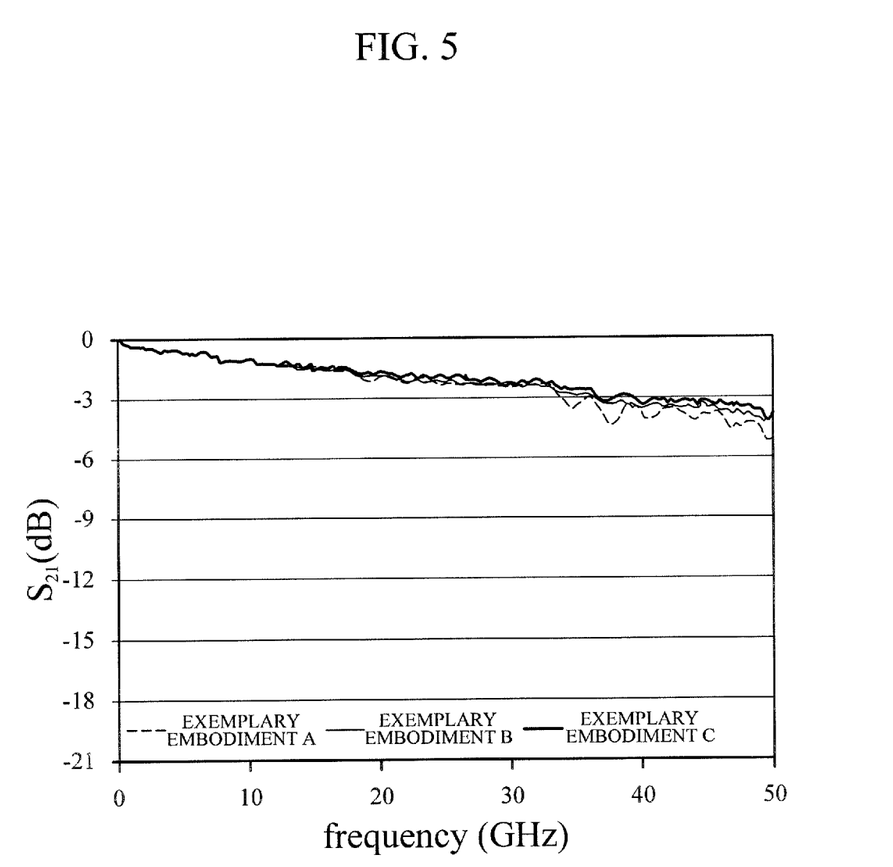
FIG. 5 is a diagram illustrating characteristics of transmission loss according to exemplary embodiments A, B, and C, each of which shows different thickness of a first conductive line.
Figure 6:
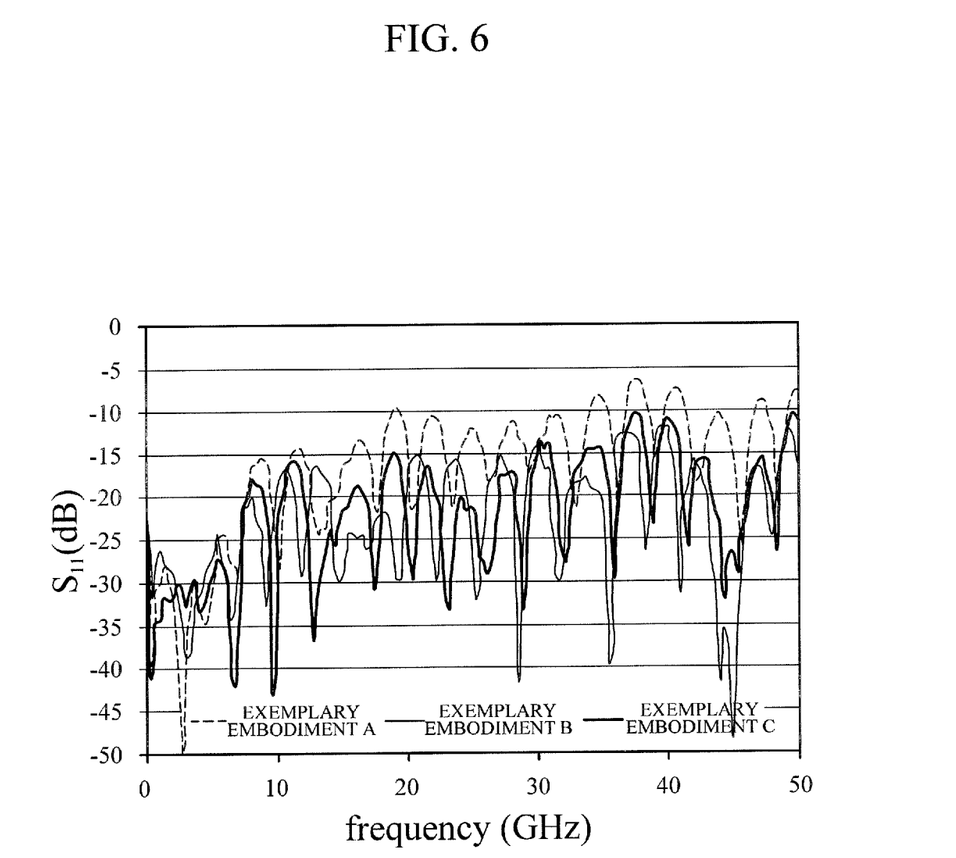
FIG. 6 is a diagram illustrating characteristics of return loss according to the exemplary embodiments A, B, and C in FIG. 5.

Depending on the thickness 't' of a first conductive line 121, an adjustment of the high-speed signal transmission characteristics of the high-speed signal lines 111 can be made, which may be shown through graphs illustrated in FIGS. 5 and 6. Here, FIG. 5 is a diagram illustrating characteristics of transmission loss S21 according to exemplary embodiments A, B, and C, each of which shows a different thickness of a first conductive line. FIG. 6 is a diagram illustrating the characteristics of return loss S11 according to the exemplary embodiments A, B, and C in FIG. 5.

As illustrated in FIGS. 5 and 6, in a case in which the thickness 't' of the first conductive line 121 is adjusted differently for each of the exemplary embodiments A, B, and C, it is shown that both the transmission loss S21 and the return loss S11 change. Furthermore, the graph shows that an adjustment of the thickness 't' of the first conductive line 121 results in a greater change in return loss S11 than in transmission loss S21.

Using this result, even though an optical transceiver connection method changes the optimum conditions of an optical module's electrical signal characteristics, a sub-substrate 120 with first conductive lines 121 adjusted thereto is provided so as to be coupled to high-speed signal lines 111 of a main substrate 110, thereby changing the interface 100 for transmitting a high-speed signal. Thus, a simple change of the interface 100 may prevent a decrease in the high-speed signal transmission characteristics.

Figure 7:
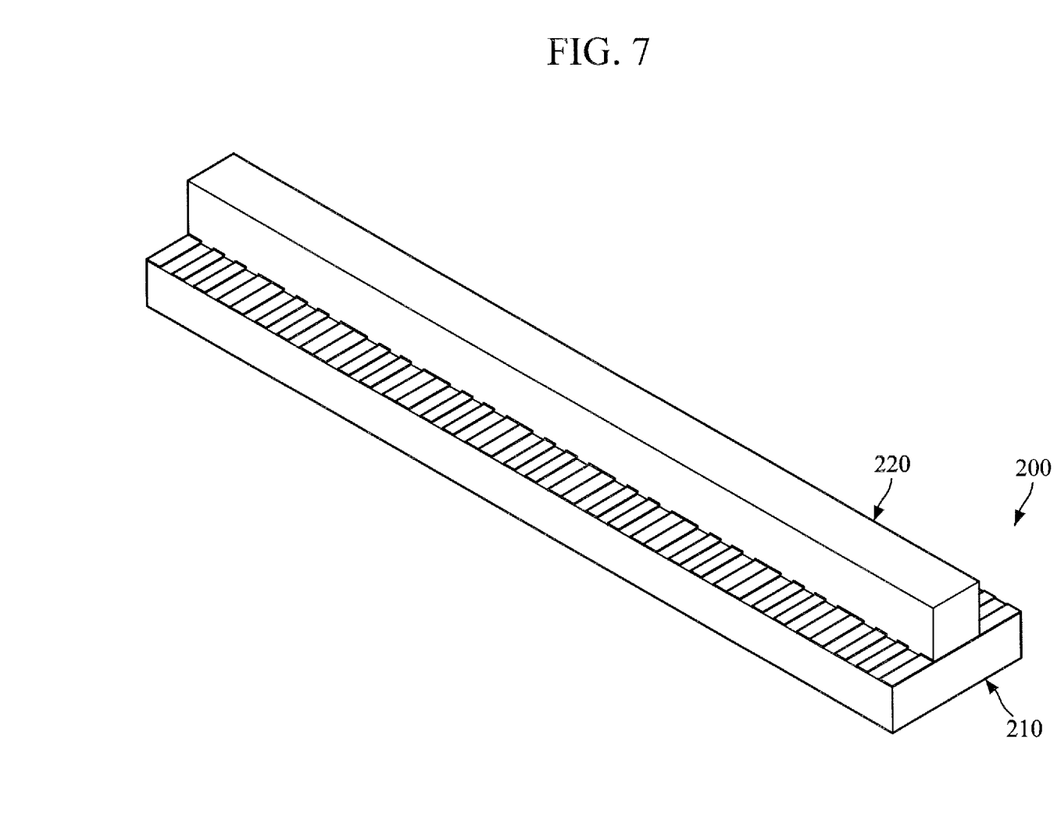
FIG. 7 is a perspective view, according to another exemplary embodiment, illustrating an interface for transmitting a high-speed signal.
Figure 8:
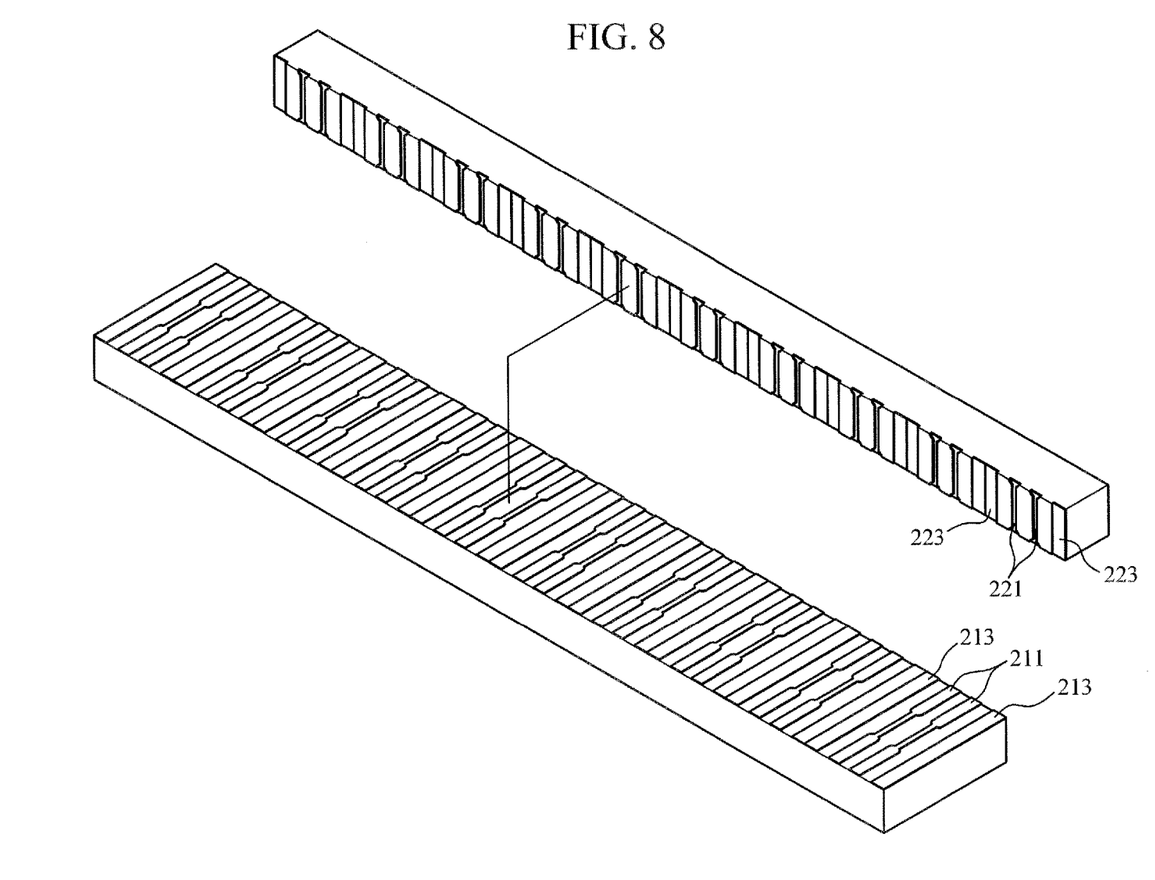
FIG. 8 is an exploded perspective view of FIG. 7.

As illustrated in FIGS. 7 and 8, an interface 200 for transmitting a high-speed signal may be formed in a structure in which a plurality of interfaces 100 described above are connected in parallel. That is, the interface 200 may include plural pairs of high-speed signal lines 211 formed onto the upper surface of a main substrate 210. First conductive lines 221 may be formed onto the lower surface of a sub-substrate 220 so as to, respectively, overlap partially with the high-speed signal lines 211. Each of the first conductive lines 221 may be installed in the same way as the first conductive line 121 described above. On the upper surface of the main substrate 210, each of the ground lines 213 may be disposed on both sides of the pair of the high-speed signal lines 211, wherein the pair is placed between each of the ground lines 213. Each of the second conductive lines 223 formed on the lower surface of the sub-substrate 220 may be installed to partially overlap with each of the ground lines 213.

Figure 9:
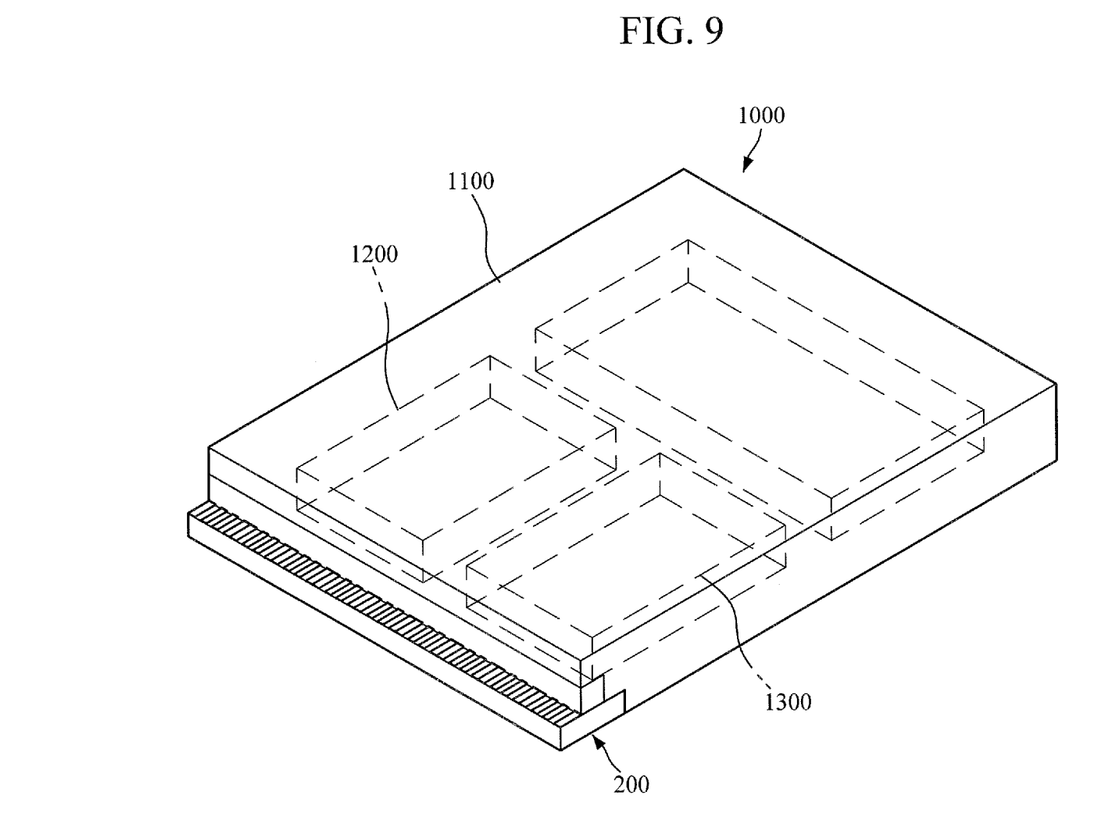
FIG. 9 is a perspective view illustrating an optical module according to an exemplary embodiment.
Figure 10:
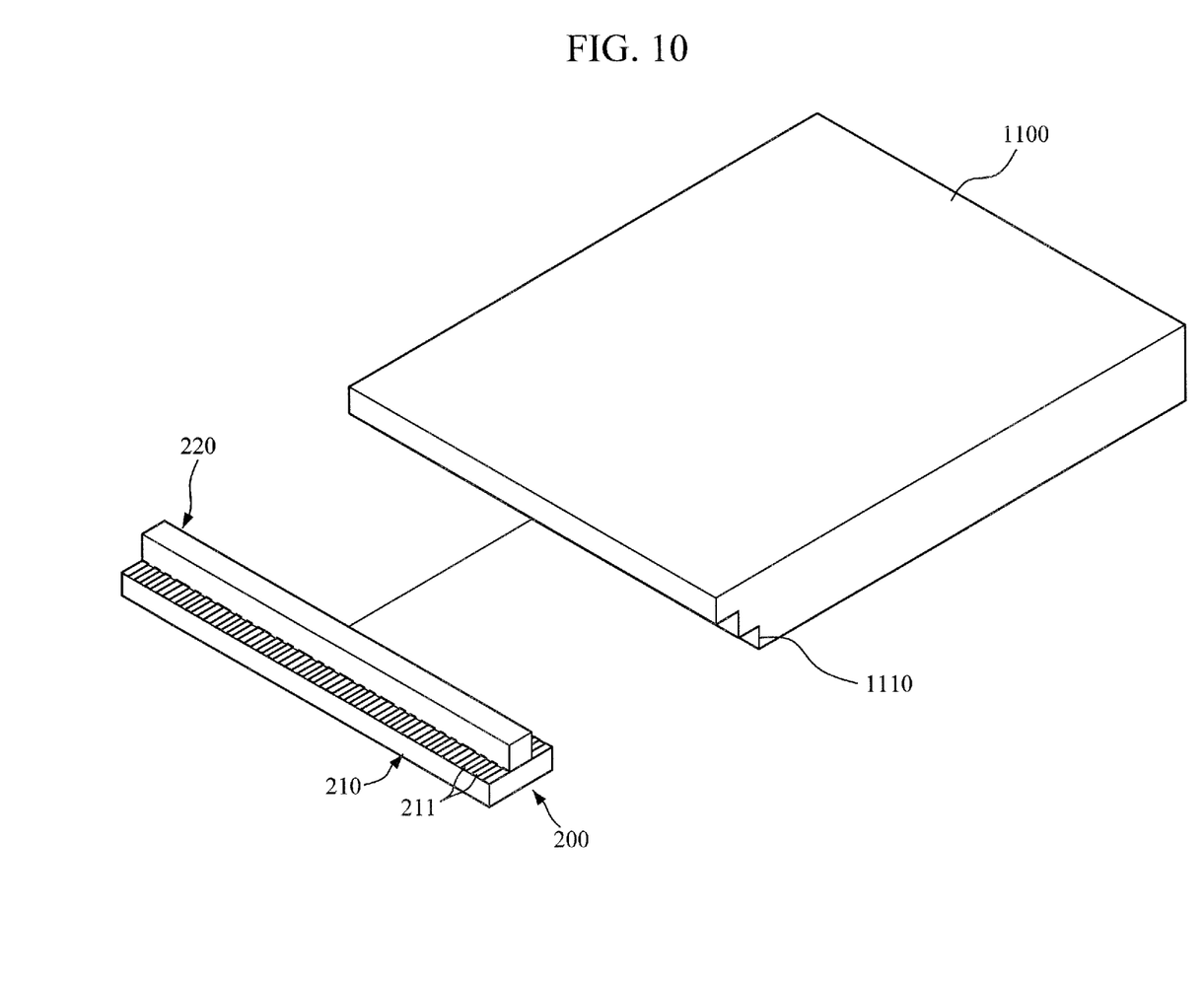
FIG. 10 is an exploded perspective view of FIG. 9.

An optical module 1000 in which the interface 200 is applied may be formed as illustrated in FIGS. 9 and 10.

Referring to FIGS. 9 and 10, the optical module 1000 includes a case 1100 and an optical element 1200. The case 1100 accommodates on one side an interface 200 for transmitting a high-speed signal through an opening 1110 on one end thereof in such a manner that one end of high-speed signal line 211 is outwardly exposed. One part of the case 1100 may be formed to be open to and connected to the inner space. The case 1100 may include the main substrate 210 and the sub-substrate 220, which are inserted into and fixed to the opening 1110 in such a manner that one end of each high-speed signal line 211 is outwardly exposed. The other ends of the high-speed signal lines 211 may be located within the case 1100. The end of high-speed signal line 211 that is exposed outwardly from the case 1100 may be electrically connected to a PCB (not illustrated) of an optical transceiver. For example, the high-speed signal lines 211 of the optical module 1000 may be electrically connected to the PCB of the optical transceiver through a direct connection method using solder, a connection method using a flexible PCB, and the like.

Accommodated in the case 1100, an optical element 1200 is electrically connected to at least a part of the high-speed signal lines 211. That is, the optical element 1200 may be electrically connected to the other ends of the part of the high-speed signal lines 211 within the case 1100. The optical element 1200 may be connected to the high-speed signal lines 211 by way of soldering, or the like. Along with the optical element 1200 the case 1100 accommodates an electric element 1300, which is electrically connected to a part of the high-speed signal lines 211.

According to the present disclosure, even though an optical transceiver connection method changes the optimum conditions of an optical module's electrical signal characteristics, a sub-substrate with first conductive lines adjusted to the optimum conditions is provided, which is coupled to high-speed signal lines of a main substrate, thereby changing the interface for transmitting a high-speed signal. Thus, a simple change of the interface may prevent a decrease in the high-speed signal transmission characteristics.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An interface for transmitting a high-speed signal, comprising:
   a main substrate having at least one high-speed signal line formed on an upper surface thereof; and
   a sub-substrate, which has a first conductive line formed on a lower surface thereof so as to adjust high-speed signal transmission characteristics of the at least one high-speed signal line, and is coupled to the upper surface of the main substrate in such a manner that the first conductive line partially overlaps with the at least one high-speed signal line,
   wherein a thickness of the first conductive line enables the high-speed signal transmission characteristics to be adjusted.

2. The interface of claim 1, wherein the first conductive line is formed to partially overlap with the at least one high-speed signal line in a same shape as each other.

3. The interface of claim 1, wherein the sub-substrate is coupled to the upper surface of the main substrate so that both ends of the at least one high-speed signal line are outwardly exposed.

4. The interface of claim 1, wherein the main substrate has a plurality of high-speed signal lines arranged on the upper surface thereof, wherein the first conductive line is arranged on the lower surface of the sub-substrate in a same form as each of the plurality of high-speed signal lines and partially overlaps with each of the plurality of high-speed signal lines.

5. The interface of claim 1, wherein at least one ground line is formed on the upper surface of the main substrate, and a second conductive line is formed on the lower surface of the sub-substrate, wherein the second conductive line is partially overlapped with the at least one ground line.

6. An optical module, comprising:
   an interface for transmitting a high-speed signal, the interface comprising:
      a main substrate having high-speed signal lines arranged on an upper surface thereof; and
      a sub-substrate, which has first conductive lines arranged and formed on a lower surface thereof in a same form as the high-speed signal lines so as to adjust high-speed signal transmission characteristics of the high-speed signal lines, and is coupled to the upper surface of the main substrate in such a manner that the first conductive lines partially overlap, respectively, with the high-speed signal lines;
   a case configured to accommodate the interface through an opening on the end thereof in such a manner that one end of each of the high-speed signal lines is outwardly exposed; and
   an optical element accommodated in the case and electrically connected to at least a part of the high-speed signal lines,
   wherein a thickness of the first conductive line enables the high-speed signal transmission characteristics to be adjusted.

7. The optical module of claim 6, wherein the first conductive lines are formed to partially overlap, respectively, with the high-speed signal lines in a same form as each other.

8. The optical module of claim 6, wherein the sub-substrate is coupled to the upper surface of the main substrate so that both ends of the high-speed signal lines are outwardly exposed.

9. The optical module of claim 6, wherein at least one ground line is formed on the upper surface of the main substrate, and a second conductive line is formed on a lower surface of the sub-substrate, wherein the second conductive line is partially overlapped with the at least one ground line.

10. An interface for transmitting a high-speed signal, comprising:
    a main substrate having at least one high-speed signal line formed on an upper surface thereof; and
    a sub-substrate, which has a first conductive line formed on a lower surface thereof so as to adjust high-speed signal transmission characteristics of the at least one high-speed signal line, and is coupled to the upper surface of the main substrate in such a manner that the first conductive line partially overlaps with the at least one high-speed signal line,
    wherein the main substrate has a plurality of high-speed signal lines arranged on the upper surface thereof, wherein the first conductive line is arranged on the lower surface of the sub-substrate in a same form as each of the plurality of high-speed signal lines and partially overlaps with each of the plurality of high-speed signal lines.

11. The interface of claim 10, wherein a thickness of the first conductive line enables the high-speed signal transmission characteristics to be adjusted.

12. The interface of claim 10, wherein the first conductive line is formed to partially overlap with the at least one high-speed signal line in a same shape as each other.

13. The interface of claim 10, wherein the sub-substrate is coupled to the upper surface of the main substrate so that both ends of the at least one high-speed signal line are outwardly exposed.

14. The interface of claim 10, wherein at least one ground line is formed on the upper surface of the main substrate, and a second conductive line is formed on the lower surface of the sub-substrate, wherein the second conductive line is partially overlapped with the at least one ground line.

* * * * *